(12) United States Patent
Gohde et al.

(10) Patent No.: US 7,347,219 B2
(45) Date of Patent: Mar. 25, 2008

(54) METER BAR AND METERING SYSTEM

(75) Inventors: Jon Gohde, Whitewater, WI (US);
Brian Kretz, Dubuque, IA (US)

(73) Assignee: A. Y. McDonald Mfg. Co., Dubuque, IA (US)

( * ) Notice: Subject to any disclaimer, the term of this patent is extended or adjusted under 35 U.S.C. 154(b) by 165 days.

(21) Appl. No.: 11/254,579

(22) Filed: Oct. 20, 2005

(65) Prior Publication Data
US 2007/0089791 A1    Apr. 26, 2007

(51) Int. Cl.
*F16K 27/00*    (2006.01)
(52) U.S. Cl. .................. 137/613; 137/315.06; 137/385; 137/556.3; 73/201
(58) Field of Classification Search ................ 137/613, 137/625.47, 385, 556.3, 556.6, 315.06; 73/201
See application file for complete search history.

(56) References Cited

U.S. PATENT DOCUMENTS

| | | | | |
|---|---|---|---|---|
| 2,579,656 A | * | 12/1951 | Douglas et al. ................ | 73/201 |
| 3,173,295 A | * | 3/1965 | Magleby ....................... | 73/201 |
| 3,238,969 A | * | 3/1966 | Champion ............. | 137/599.13 |
| 5,533,549 A | * | 7/1996 | Sherman ...................... | 137/557 |
| 5,785,086 A | * | 7/1998 | Boyce et al. .......... | 137/625.38 |
| 6,283,153 B1 | * | 9/2001 | Brisco et al. .......... | 137/625.47 |

* cited by examiner

*Primary Examiner*—Kevin Lee
(74) *Attorney, Agent, or Firm*—Wood, Phillips, Katz, Clark & Mortimer

(57) ABSTRACT

A meter bar and meter bar system are provided for directing a fluid. The meter bar includes a first portion, a second portion and a bypass path extending between the first and second portions. The first portion includes a first service port, a first meter port and a first valve. The second portion includes a second service port, a second meter port and a second valve. Each of the first and second valves are movable between metering positions and bypass positions.

42 Claims, 10 Drawing Sheets

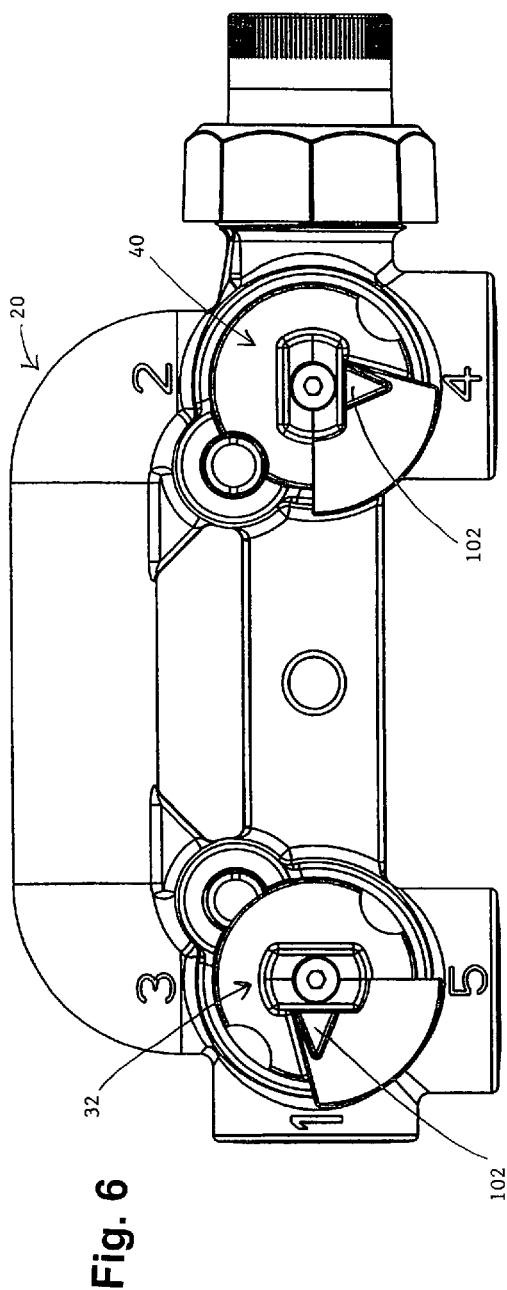
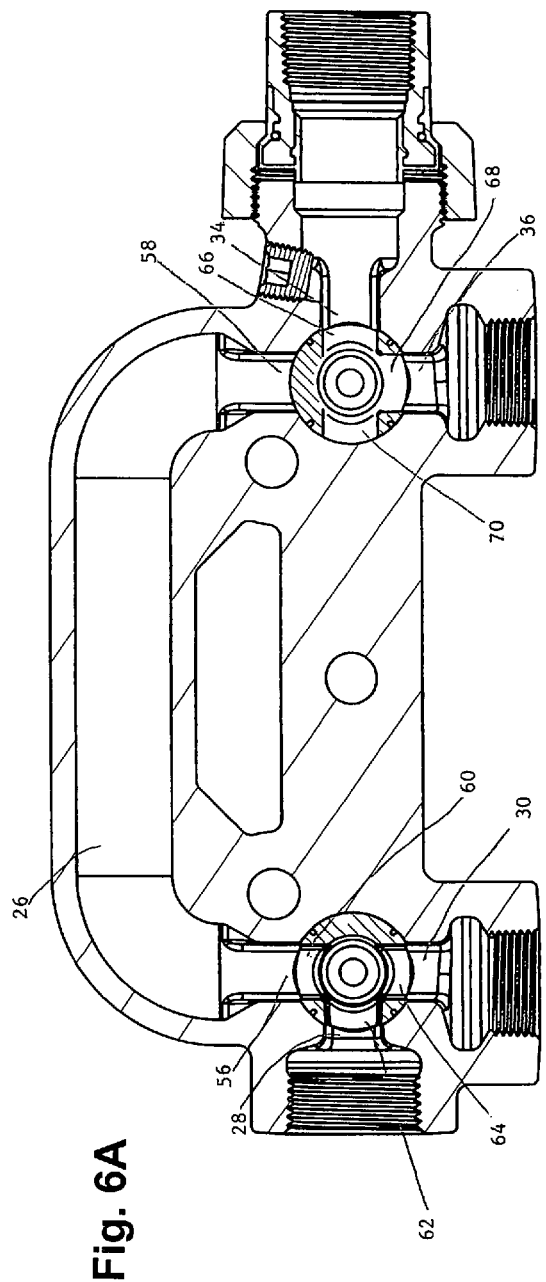
Fig. 6
Fig. 6A

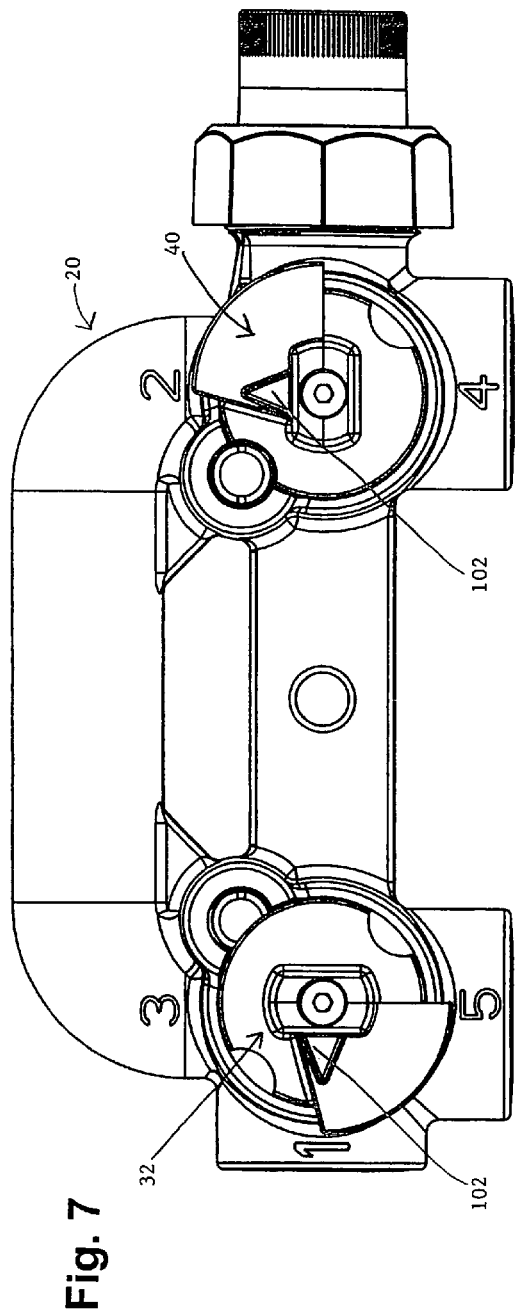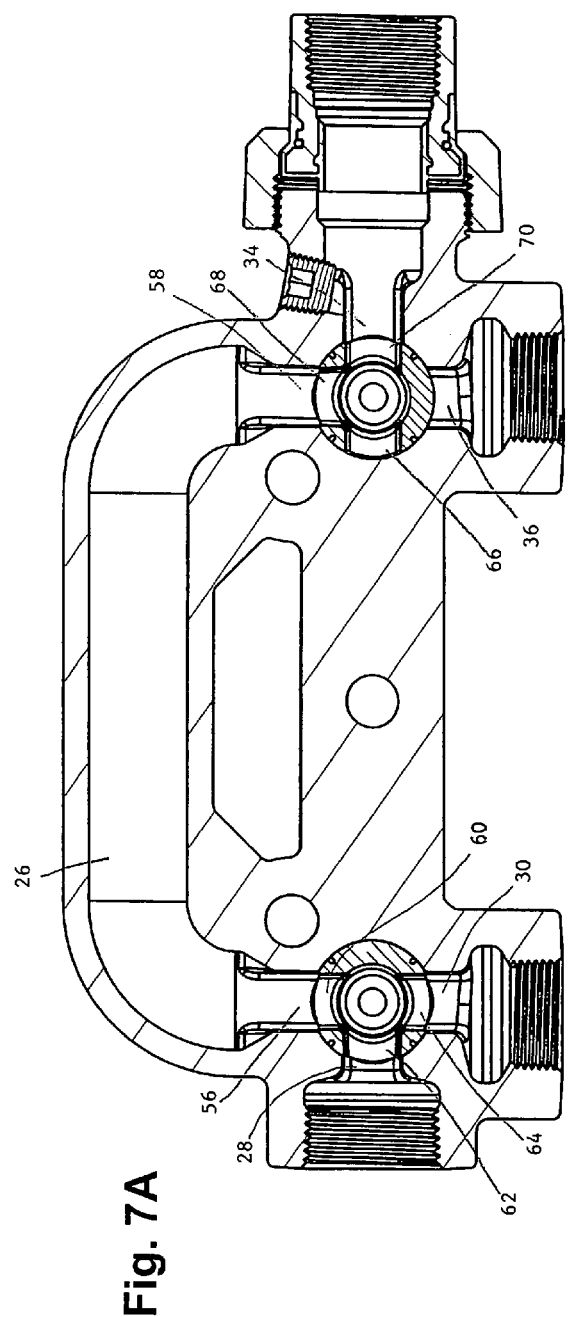
Fig. 7
Fig. 7A

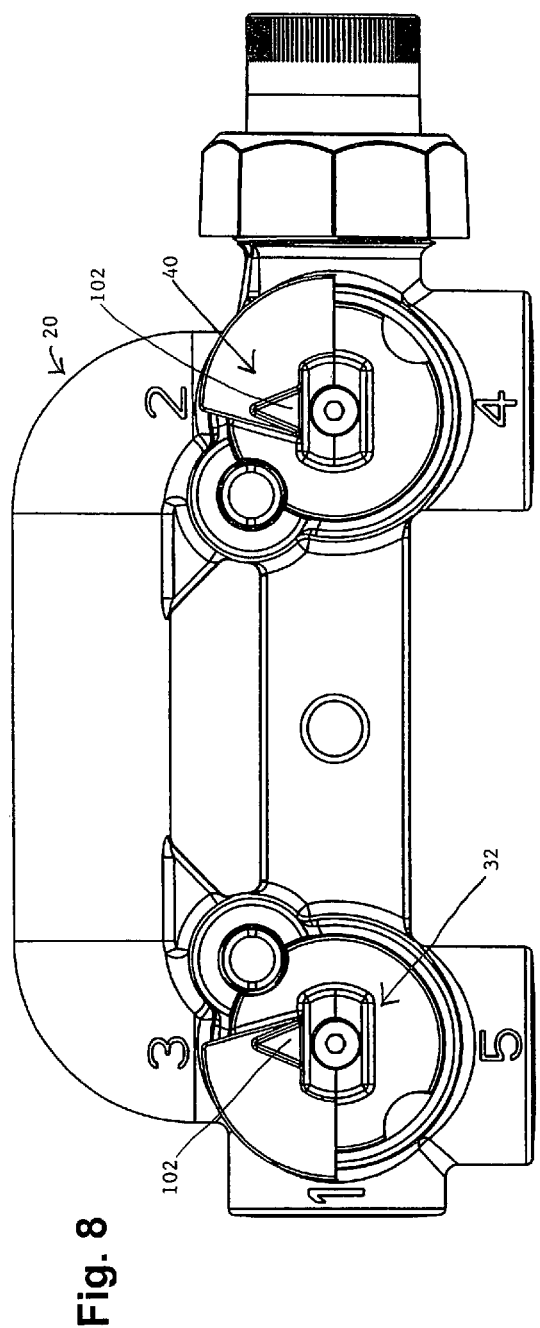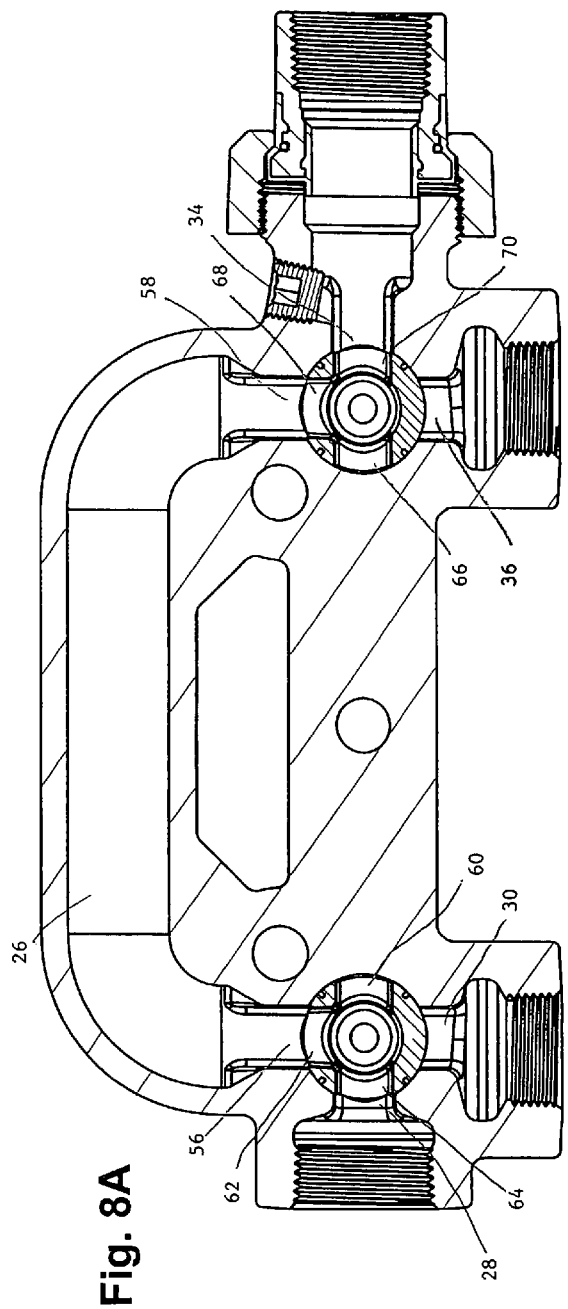
Fig. 8
Fig. 8A

METER BAR AND METERING SYSTEM

FIELD OF THE INVENTION

This invention relates to fluid metering bars such as, for example, as used in connection with a gas meter, and in more particular applications, to fluid metering bars with bypass pathways for removal of meters without flow interruption.

BACKGROUND OF THE INVENTION

Many fluids, such as for example, natural gas or other gases are metered in a variety of different manners. Additionally, there are a variety of different providers of fluids, such as natural gas that employ a plurality of main pipelines to deliver fluids to end users. In order to measure the amount of the fluids that are delivered to individual end users, the providers use meters at the end user's facility. Such meters are well known in the art.

However, a variety of problems exist when the providers determine that the meters require servicing or replacement. When a provider services or replaces a meter, typically, the supply of the fluid to the end user is stopped. However, the end users do not want the supply of the fluid to stop, even if just momentarily. In part, this is because appliances and other devices requiring fluids, such as natural gas, have pilot burners that continuously run to serve as an ignition source for the appliance. If the pilot burner were to be starved of gas, the burner would go out. Subsequently, when the gas service is restored, the pilot burner would have to be re-ignited to operate.

Therefore, a variety of bypass systems have been developed to supply fluid to an end user when the providers service or replace a fluid meter. However, these bypass systems have problems as well.

For example, as many of the bypass systems are temporary, they sometimes limit the supply of fluids and therefore can starve some of the devices. As devices are starved of the required fluids, the device may become inoperable or damaged from the limited flow.

Additionally, many of the bypass systems have a variety of external components that must be installed prior to bypassing the meters. For example, an auxiliary port may be included on the meter bar which requires the use of external flow paths to bypass the location of the meter. These external components sometimes must be brought to the site by the service technician. Additionally, some bypass systems are bulky and can get in the way as the meter is serviced.

SUMMARY OF THE INVENTION

In accordance with one form of the invention, a meter bar is provided for directing a fluid. The meter bar includes a first portion, a second portion and a bypass path. The first portion includes a first service port, a first meter port and a first valve. The second portion includes a second service port, a second meter port and a second valve. The bypass path extends between the first portion and the second portion. The first valve is movable between a metering position and a bypass position. In the metering position the first valve defines a flow path for the fluid between the first service port and the first meter port, and in the bypass position the first valve prevents the fluid from flowing between the first service port and the first meter port. The second valve is movable between a metering position and a bypass position. In the metering position the second valve defines a flow path for the fluid between the second meter port and the second service port, and in the bypass position the bypass valve defines a flow path for the fluid between the bypass path and the second service port.

In accordance with one form, a fluid metering system is provided for measuring fluid flow. The system includes a fluid meter bar and a fluid meter. The meter bar includes a first portion, a second portion and a bypass path. The first portion includes a first service port, a first meter port and a first valve. The second portion includes a second service port, a second meter port and a second valve. The bypass path extends between the first portion and the second portion. The first valve is movable between a metering position and a bypass position. In the metering position the first valve defines a flow path for the fluid between the first service port and the first meter port, and in the bypass position the first valve prevents the fluid from flowing between the first service port and the first meter port. The second valve is movable between a metering position and a bypass position. In the metering position, the second valve defines a flow path for the fluid between the second meter port and the second service port, and in the bypass position the second valve defines a flow path for the fluid between the bypass path and the second service port. The fluid meter includes a first fluid connection coupled to the first meter port, a second fluid connection coupled to the second meter port and a meter flow path extending between the first and second flow connectors.

In one form, a meter bar is provided for directing a fluid. The meter bar includes an inlet portion, an outlet portion and a bypass path. The inlet portion includes a fluid inlet port, a meter inlet port and an inlet valve. The outlet portion includes a fluid outlet port, a meter outlet port and an outlet valve. The bypass path extends between the inlet portion and the outlet portion. The inlet valve is movable between a metering position and a bypass position. In the metering position the inlet valve defines a flow path for the fluid between the fluid inlet port and the meter inlet port. In the bypass position the inlet valve provides a flow path for the fluid between the fluid inlet port and the bypass path. The outlet valve is movable between a metering position and a bypass position. In the metering position the outlet valve provides a flow path for the fluid between the meter outlet port and the fluid outlet port. In the bypass position the outlet valve provides a flow path for the fluid between the bypass path and the fluid outlet port.

In one form, the first valve includes at least one intermediate position between the metering and bypass positions such that the first valve simultaneously defines a flow path between the first service port and the first meter port and between the first service port and the bypass path.

According to one form, the second valve includes at least one intermediate position between the metering and bypass positions such that the second valve simultaneously defines a flow path between the second service port and the second meter port and between the second service port and the bypass path.

In one form, at least one valve aperture in the first valve is sized to define a flow path between the first service port and both of the first meter port and the bypass path when the first valve is in an intermediate position.

In one form, the meter bar further includes a lock on at least one of the first and second valves to selectively prevent the valve from moving from the metering position into the bypass position and from the bypass position into the metering position.

In accordance with one form, the first valve is a rotatable two-way valve and the second valve is a rotatable three-way valve.

In one form, the first valve is a rotatable three-way valve and the second valve is a rotatable three-way valve.

According to one form, the bypass path has a linear configuration extending from the first portion to the second portion.

In accordance with one form, the bypass path has a U-shaped configuration extending from the first portion to the second portion.

In one form, the meter bar further includes indicators on an exterior surface of the meter bar to represent the positions of the first and second valves.

According to one form, the second valve in the bypass position prevents the fluid from flowing between the bypass path and the second meter port.

In one form, the first valve in the bypass position defines a flow path between the first service port and the bypass path.

Other objects, advantages, and features will become apparent from a complete review of the entire specification, including the appended claims and drawings.

BRIEF DESCRIPTION OF THE DRAWINGS

FIG. 6 is an exterior view of the meter bar of FIG. 5 having the left valve in an intermediate position and the right valve in a metering position;

FIG. 6A is a cutaway view of the meter bar of FIG. 6;

FIG. 7 is an exterior view of the meter bar of FIG. 5 having the left valve in an intermediate position and the right valve in a bypass position;

FIG. 7A is a cutaway view of the meter bar of FIG. 7;

FIG. 8 is an exterior view of the meter bar of FIG. 5 having both valves in the bypass positions;

FIG. 8A is a cutaway view of the meter bar of FIG. 8.

DETAILED DESCRIPTION OF THE PREFERRED EMBODIMENTS

The present invention will be described hereinafter as a meter bar and meter system, such as, for example, a meter bar for use in conjunction with a natural gas flow meter. However, it should be understood that the invention is applicable to any meter bar for use with any fluid flow meter. Accordingly, no limitation to any particular use is intended except insofar as expressed in the appended claims.

Figure 1:
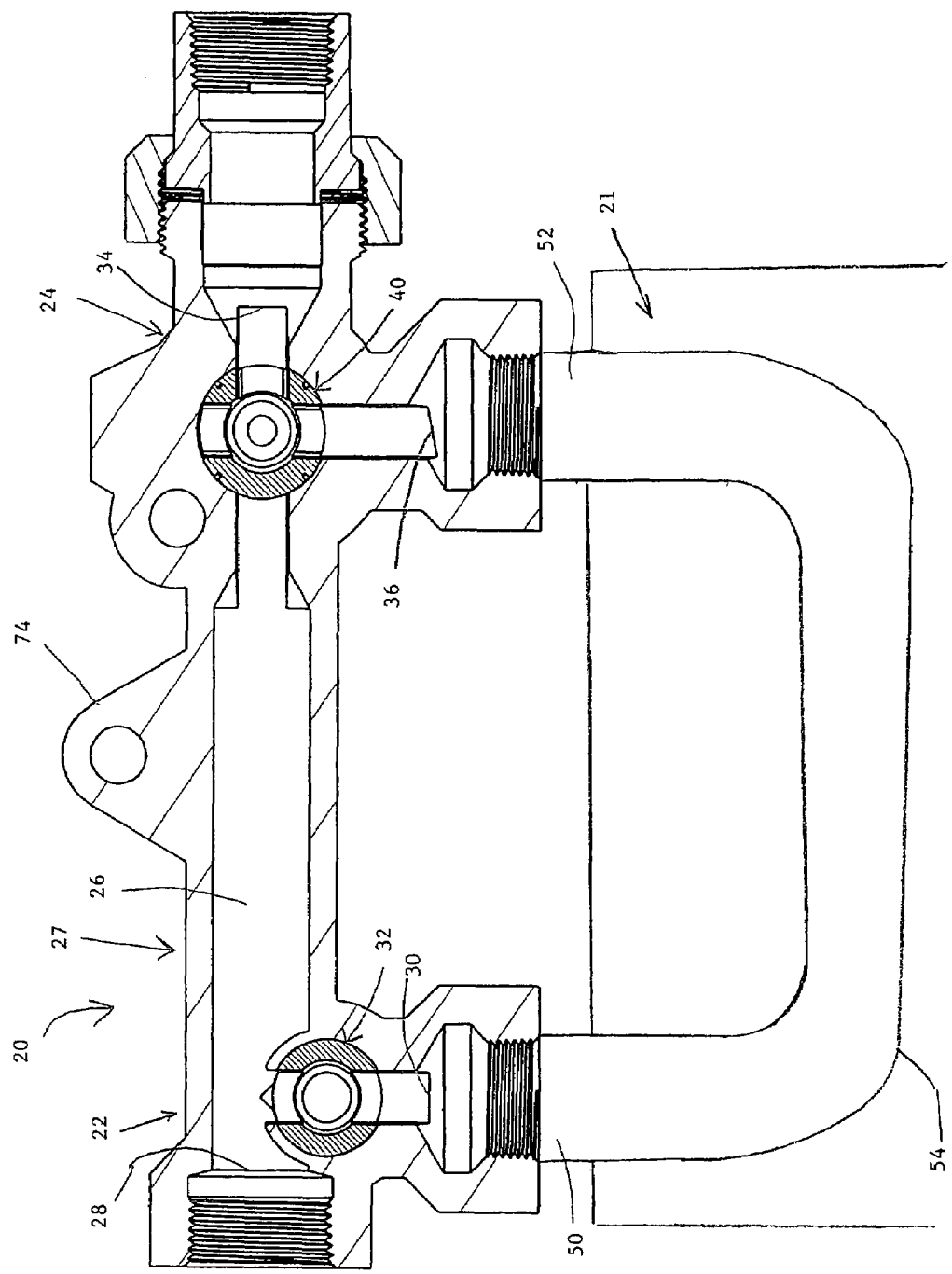
FIG. 1 is a cutaway view of a meter bar and attached meter.

Referring to FIG. 1, a meter bar 20 is shown with an attached meter 21. The meter bar 20 includes a first portion 22, a second portion 24 and a bypass path 26, all defined within a meter bar housing 27. The bypass path 26 extends between the first portion 22 and the second portion 24. The first portion 22 typically is the inlet portion of the meter bar 20 and includes a first service port 28, a first meter port 30 and a first valve 32. The first service port 28 generally is the input port from the fluid service line (not shown). The first meter port 30 generally is the input port into the meter 21.

The second portion 24 typically is the outlet portion of the meter bar 20 and includes a second service port 34, a second meter port 36 and a second valve 40. The second service port 34 generally is the output port from the meter bar 20 to an end user's facility (not shown). The second meter port 36 is the outlet port from the meter 21 to the meter bar 20.

As seen in FIG. 1, the meter 21 includes a first fluid connection 50 coupled to the first meter port 30, a second fluid connection 52 coupled to the second meter port 36 and a meter path, shown schematically at 54, extending between the first and second flow connectors 50,52. The meter 21 also includes additional metering structure (not shown) as understood by those skilled in the art. The meter 21 and its actual operation will not be discussed in detail as it may be a conventional meter known by those skilled in the art. The meter 21 may be coupled to the meter bar 20 in any manner known by those skilled in the art.

It should also be understood by those skilled in the art that the ports used as inlets and outlets of the meter bar, such as first service port 28, second service port 34, first meter port 30 and second meter port 36 may take any number of forms and orientations. For example, while the ports 28,34,30,36 are shown in FIG. 1 as extending along the plane of the drawing paper, it should be understood that the relative orientations may change in other embodiments and may, for example, extend into, out of, or at an angle to the plane of the drawing paper.

A variety of different valves may be used as the first and second valves 32,40. For example, as illustrated in FIG. 1, the first valve 32 is a rotatable, two-way valve, while the second valve 40 is a rotatable, three-way valve. As another example, referring to FIGS. 2-9A, the first valve 32 is a rotatable three-way valve, as is the second valve 40. While the rotatable vales of FIGS. 1-9A are preferred, the valves 32,40 may take on any number of other forms of valves as understood by those skilled in the art as suitable for use in a meter bar. The type of valve chosen may depend on a number of factors such as the physical form of the fluid, such as liquid or gas, and the actual fluid that is flowing, such as natural gas as compared to oxygen.

Figure 2:
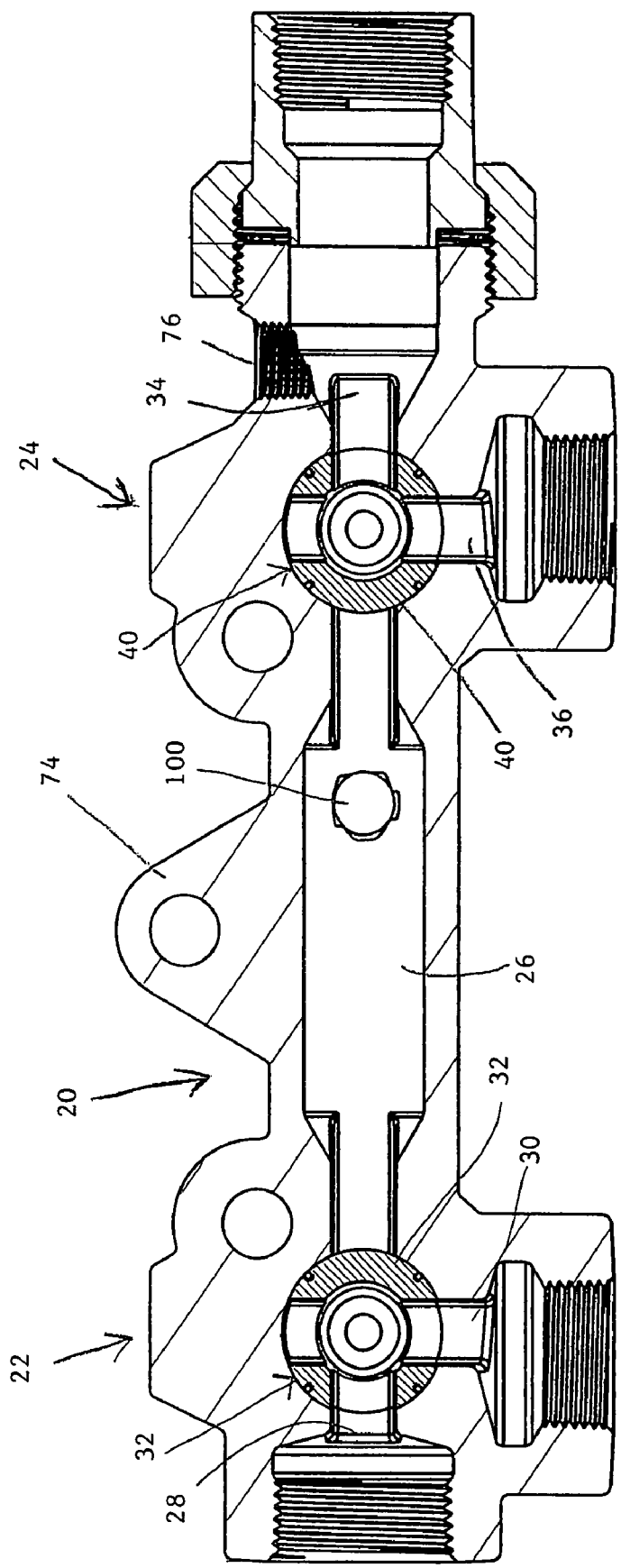
FIG. 2 is a cutaway view of an alternative embodiment of a meter bar.
Figure 3:
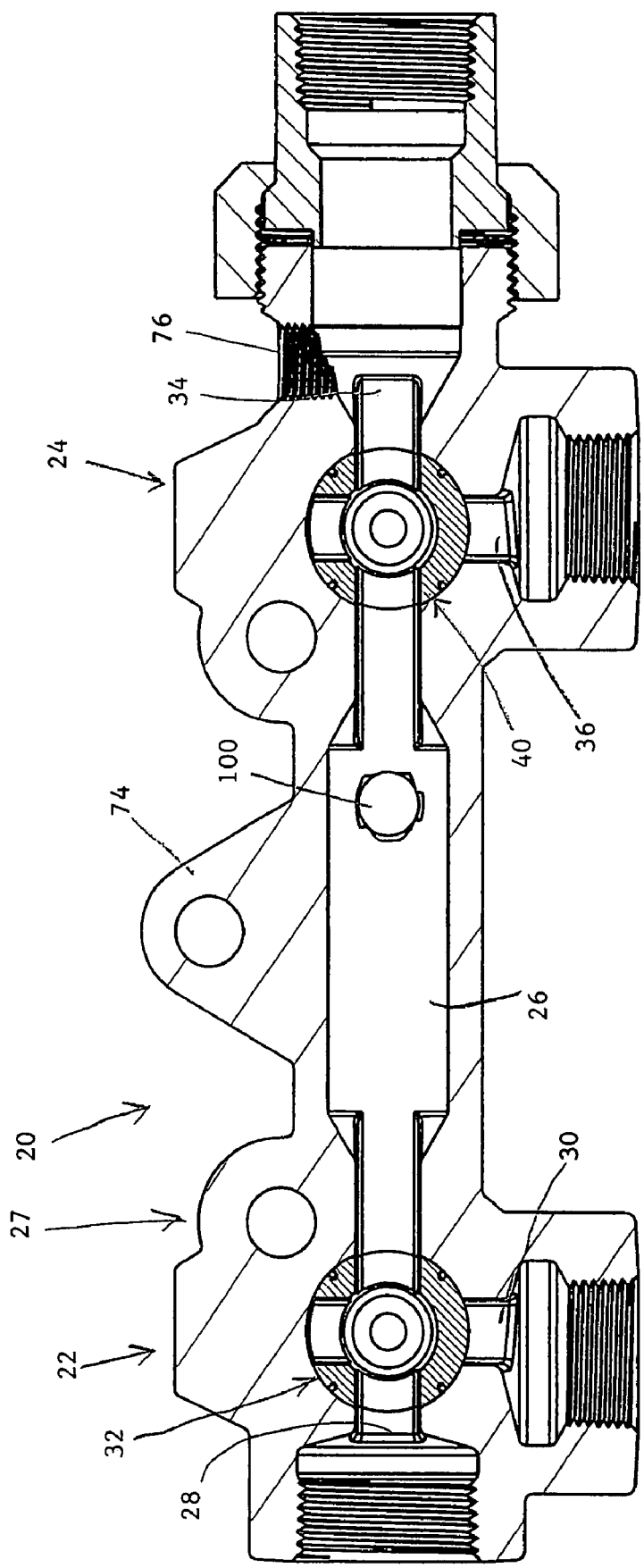
FIG. 3 is a cutaway view of the meter bar of FIG. 2 depicting bypass positions of two valves of the meter bar.
Figure 4:
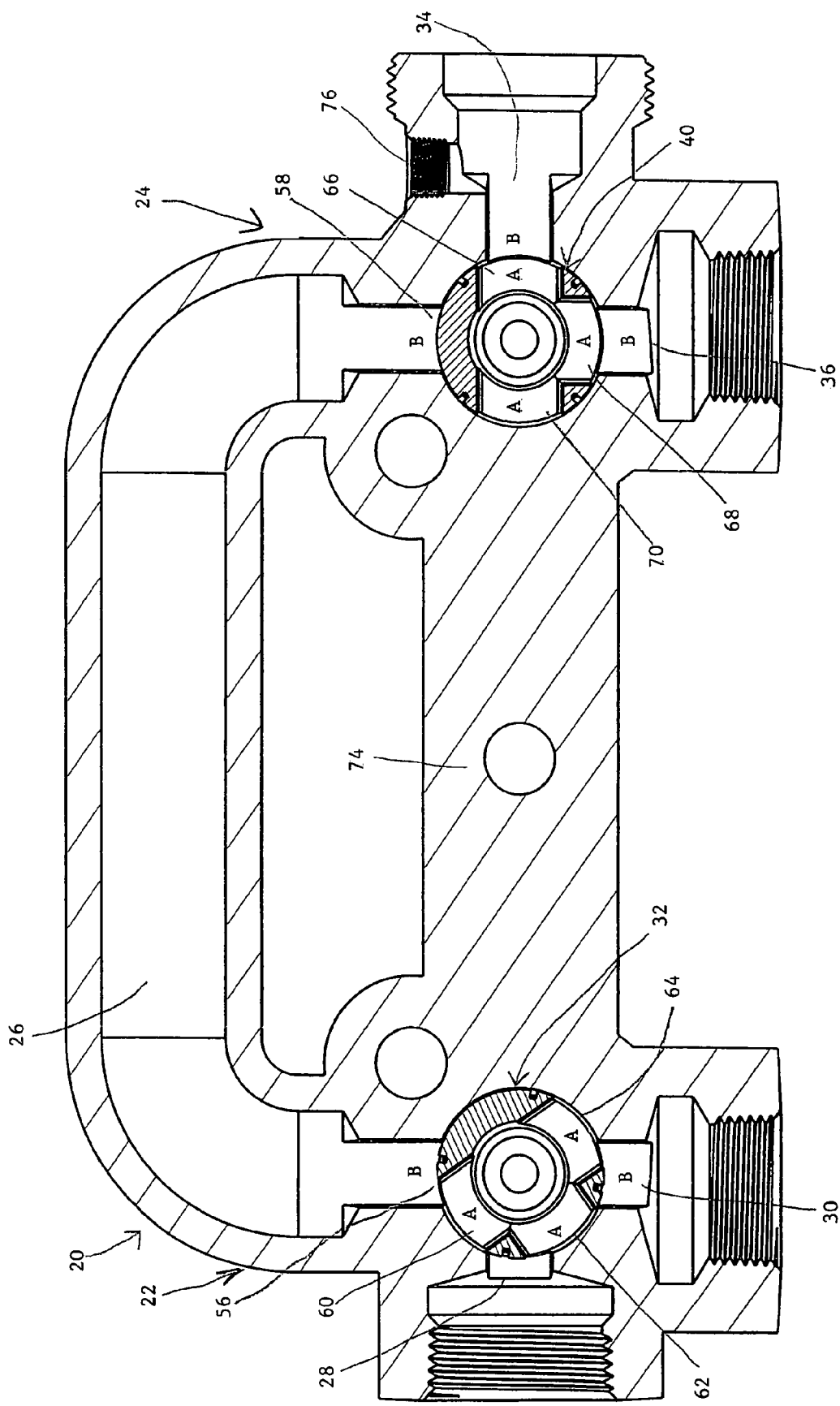
FIG. 4 is a cutaway view of a meter bar including enlarged valve apertures and an alternate form of a bypass flow path.

The valves 32,40 each are movable between a metering position and a bypass position. In the metering position, the first valve 32 defines a flow path for the fluid between the first service port 28 and the first meter port 30, while the second valve 40 defines a flow path for the fluid between the second meter port 36 and the second service port 34, as seen in FIGS. 1 and 2. The embodiment shown in FIG. 1 requires for the bypass position that the first valve 32 be rotated 90° from the illustrated metering position to prevent fluid from flowing between the first service port 28 and the first meter port 30. In the other forms of the meter bar shown in FIGS. 2-9A, the bypass position requires that the first valve 32 be positioned to define a flow path between the first service port 28 and the bypass path 26, as best seen in FIG. 3. Referring further to FIG. 3, the bypass position for the second valve 40 requires that the second valve 40 be positioned to define a flow path between the bypass path 26 and the second service port 34. This is also true for the embodiment of FIG. 1.

It should be understood that the second valve 40 and, in some instances, the first valve 32 includes at least one intermediate position between the metering and bypass positions such that the respective valve simultaneously defines a flow path between the respective service port and the respective meter port and between the respective service port and the bypass path. For example, in FIG. 4, the first valve 32 is shown in an intermediate position where the valve 32 simultaneously defines a flow path between the first service port 28 and the first meter port 30 and the first service port 28 and the bypass path 26. In this regard, it should be understood that the bypass path 26 of all of the embodiments includes a first bypass port 56 and a second bypass port 58, except for FIG. 1 which only has the second bypass port 58. Further in this regard, FIG. 4 also illustrates an additional feature that may be included with the first and second valves 32,40 to help prevent starvation of each of the ports during movement of each valve 32 and 40. Specifically, each valve 32,40 includes a plurality of apertures that can be oversized in comparison to the mating ports 28,30,56,34,36,58. For example, referring to the embodiment shown in FIG. 4, the first valve 32 includes three apertures 60,62,64 and the second valve 40 includes three apertures 66,68,70. Again referring to FIG. 4, each of the apertures 60,62,64,66,68,70 are sized larger than the ports 28,30,56,34,36,58. It should be understood by those skilled in the art that each valve 32,40 may include more than or less than three apertures as desired. Additionally, not all apertures may be the same size, nor are they all required to be larger than the ports.

The bypass path 26 also may take a variety of forms and orientations. Comparing FIGS. 1-9A, the embodiments shown in FIGS. 1-3 generally depict a bypass path 26 having a linear configuration, whereas FIGS. 4-9A illustrates a U-shaped configuration. It should be understood by those skilled in the art that the bypass path 26 may take a variety of other configurations as desired and will depend upon the particular configuration and desired location of valves 32,40.

The meter bar 20 may also include a number of other additional features. For example, the meter bar 20 may include a mounting tab 74 to structurally mount the meter bar 20. The location and orientation of the mounting tab 74 may be adjusted as desired. Compare, for example, the mounting tab 74 in FIG. 1 versus the mounting tabs 74 in FIG. 3 and in FIG. 4. Another feature that may be included is a test tap 76 for testing the fluid pressure.

Figure 5:
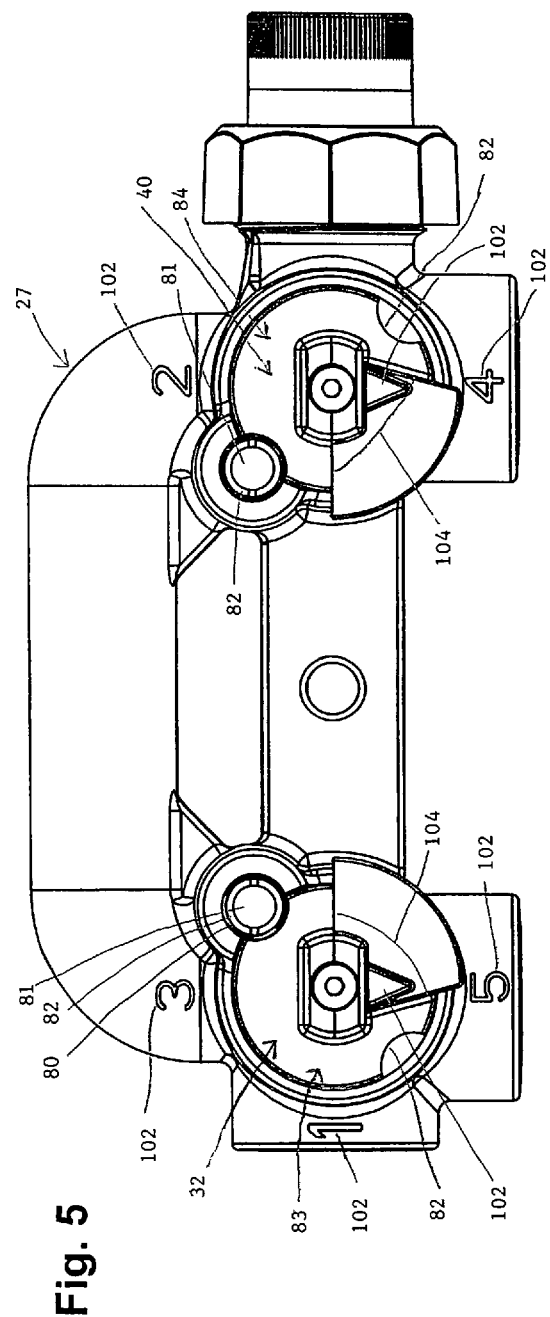
FIG. 5 is an exterior view of a meter bar depicting metering positions of two valves of the meter bar.

Safety features may also be incorporated into the meter bar 20. For example, as best seen in FIG. 5 the meter bar 20 may include one or more locks 80 to prevent movement of the valves 32,40 from one position to another, either by accident or by an unauthorized user. In the illustrated embodiments, the locks are in the form of a threaded fastener 81 that engages a relief 82 formed on an external drive member 83 and 84 of each of the valves 32 and 40. Valves can be locked in either the meter supply or bypass position. Suitable locks are further illustrated in U.S. Pat. No. 5,799,687 to Eckel et al.

It should be understood that the meter bar housing 27 is preferably constructed as a unitary structure such that the first portion 22, second portion 24 and the bypass path 26 are unitary, such as a unitary casting or molding. The valves 32,40 may be insertable and/or replaceable within the respective portions. Additionally, the meter bar 20 and valves 32,40 may be constructed of any suitable materials as understood by those skilled in the art.

The operation of the meter bar 20 will now be discussed in detail. Referring to the embodiment shown in FIG. 1, both valves 32,40 are in the metering position wherein the first valve 32 defines a flow path for the fluid between the first service port 28 and the first meter port 30 and the second valve 40 defines a flow path for the fluid between the second meter port 36 and the second service port 34. To allow the meter 21 to be removed, both of the valves 32,40 must be moved to the respective bypass positions. The second valve 40 is rotated 90° counterclockwise to the bypass position where the second valve 40 defines a flow path for the fluid between the bypass path 26 and the second service port 34. The first valve 32 is then rotated 90°, either clockwise or counterclockwise, to the bypass position where the first valve prevents the fluid from flowing between the first service port 28 and the first meter port 30. To return the meter bar 20 to metering mode, the above procedure is reversed.

The operation of the embodiment shown in FIGS. 2-3 is similar to that described above. Specifically, FIG. 2 depicts the valves 32,40 in the metering positions. The first valve 32 is rotated 90° counterclockwise to an intermediate position to define a flow path between the first service port 28 and both of the first meter port 30 and the bypass path 26. Subsequently, a tap 100 can be removed to purge the bypass path 26 and then replaced. Once the bypass path 26 has been purged, the second valve 40 can be rotated 90° counterclockwise to the bypass position as seen in FIG. 3. Thereafter, the first valve 32 can be rotated 180° to the bypass position as also seen in FIG. 3. The meter bar 20 now bypasses any connected meters 21. To return the meter bar 20 to the metering mode, the procedure is reversed.

The operation of the embodiment shown in FIGS. 5-9A will now be discussed in detail in regard to the positioning of the ports and apertures of the valves. The location of the ports and apertures of the embodiments of FIGS. 1-3 is similar to that described below.

As illustrated in FIG. 5, the meter bar 20 includes indicators 102 to indicate the position of the valves 32,40 and, by using numbers as the indicators 102, to indicate the sequential position of the valves 32,40 when changing the bar 20 from the metering mode to the bypass mode, where the meter 21 can be removed and serviced, and then returned back to the metering mode after the meter 21 has been serviced. Additionally, the meter bar 20 may include safety features such as the lock 80 which prevents the valves 32,40 from moving beyond the range of motion permitted as shown in arcs 104. The locks 80 can be unlocked to permit the valves 32,40 to be moved from the illustrated metering positions of FIG. 5.

Figure 5A:
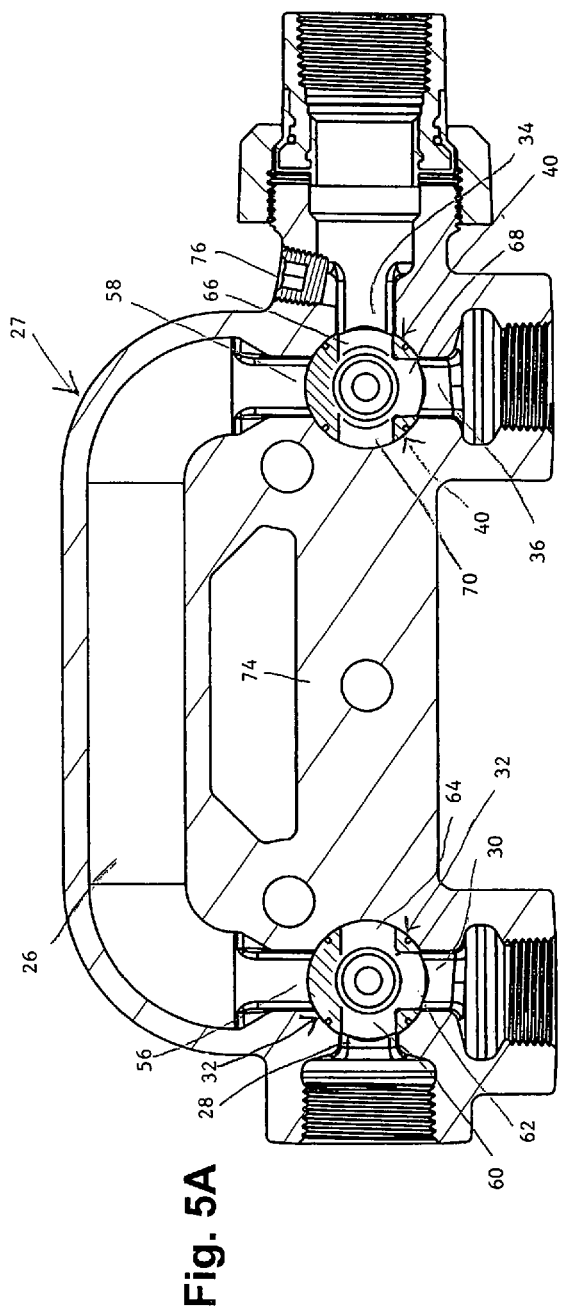
FIG. 5A is a cutaway view of the meter bar of FIG. 5.

As seen in FIGS. 5-5A, the valves 32,40 are in the metering positions. In the metering position, the first aperture 60 of the first valve 32 is fluidly coupled to the first service port 28, the second aperture 62 of the first valve 32 is fluidly coupled to the first meter port 30 and the third aperture 64 of the first valve 32 is decoupled from the ports 28, 30 and 56, the first aperture 66 of the second valve 40 is fluidly coupled to the second service port 34, the second aperture 68 of the second valve 40 is fluidly coupled to the second meter port 36, and the third aperture 70 of the second valve 40 is decoupled from the ports 34, 36 and 58.

To begin bypassing the meter (not shown), the first valve 32 is moved to an intermediate position (indicator number 1) between the metering and bypass positions such that the first valve 32 simultaneously defines a flow path between the first service port 28 and the first meter port 30 and between the first service port 28 and the bypass path 26, as seen in FIGS. 6-6A.

It should be understood that as used herein, an intermediate position is any position wherein the respective valve defines a flow path between more than two ports. The intermediate position may or may not exist between the metering and bypass positions. As illustrated in FIGS. 5-9A, the intermediate positions do exist between the metering and bypass positions. Additionally, it should be understood that there are any number of intermediate positions and therefore, the intermediate position is not a necessarily discrete position.

Subsequently, referring to FIGS. 7-7A, the second valve 40 can be moved to the bypass position (indicator number 2) where the first aperture 66 of the second valve 40 is decoupled from the ports 34, 36 and 58, the second aperture 68 of the second valve 40 is fluidly coupled to second bypass port 58 and the third aperture 70 of the second valve 40 is fluidly coupled to the second service port 34. Therefore, fluid is being supplied to the meter (not shown) through the first meter port 30, but does not flow back into the second valve 40. Instead, fluid supplied through the bypass path 26 flows through the second valve 40 to the service port 34.

Once the fluid is flowing through the bypass path 26, the flow of fluid to the meter (not shown) must be stopped so that the meter can be serviced or replaced. Referring to FIGS. 8-8A, the first valve 32 is moved to a bypass position (indicator number 3) where the first aperture 60 of the first valve 32 is decoupled from the ports 28, 30 and 56, the second aperture 62 of the first valve 32 is fluidly coupled to first bypass port 56 and the third aperture 64 of the first valve 32 is fluidly coupled to the first service port 28. In the positions shown in FIGS. 8-8A, the meter can be serviced or removed.

Figure 9:
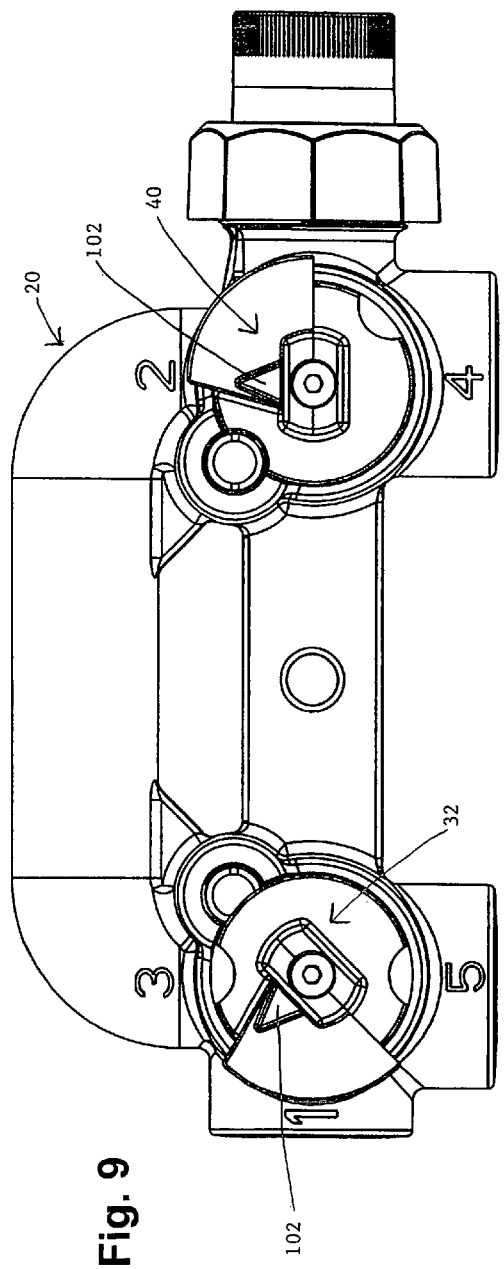
FIG. 9 is an exterior view of the meter bar of FIG. 5 having the left valve in an alternative intermediate position.
Figure 9A:
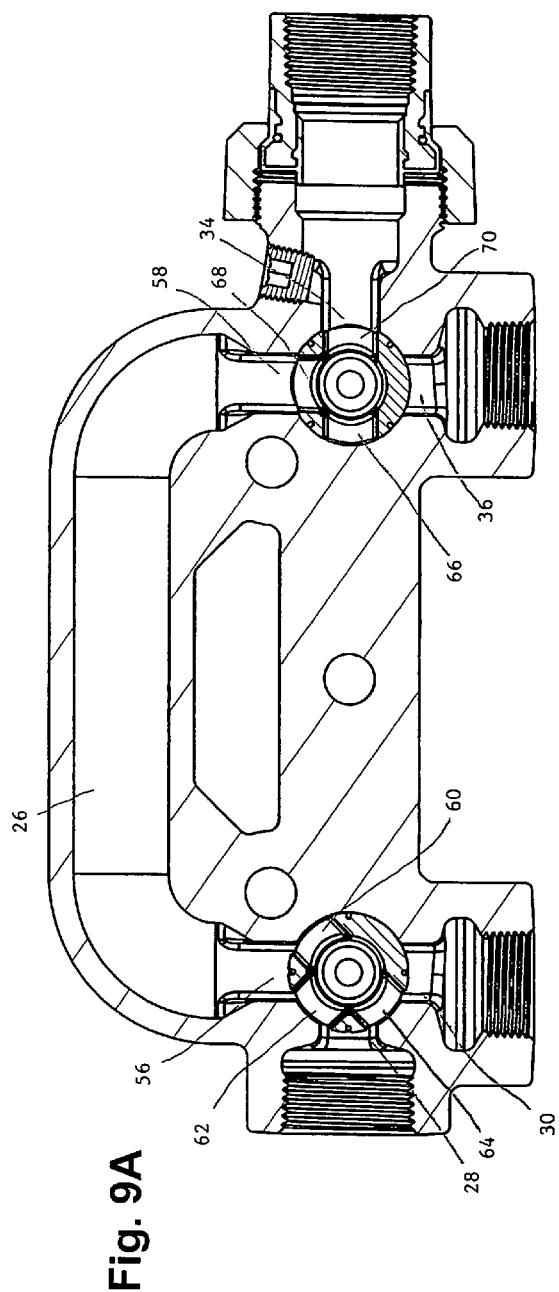
FIG. 9A is a cutaway view of the meter bar of FIG. 9.

After the meter has been serviced or replaced, the meter bar can be returned to metering. To do so, generally the meter must be purged. The meter would be connected to the first meter port 30, but not to the second meter port 36. Referring to FIGS. 9-9A, the first valve 32 is then in an intermediate position where all ports are open. In this position, fluid is still being supplied to the second valve 40 via the bypass path 26, but fluid is also being supplied to purge the meter. Once the meter has been purged, the meter is connected to the second meter port 36 and the meter bar 20 is returned to its original state by first moving the second valve 40 to its metering position (indicator number 4) and then moving the first valve 32 to its metering position (indicator number 5).

Figure 10:
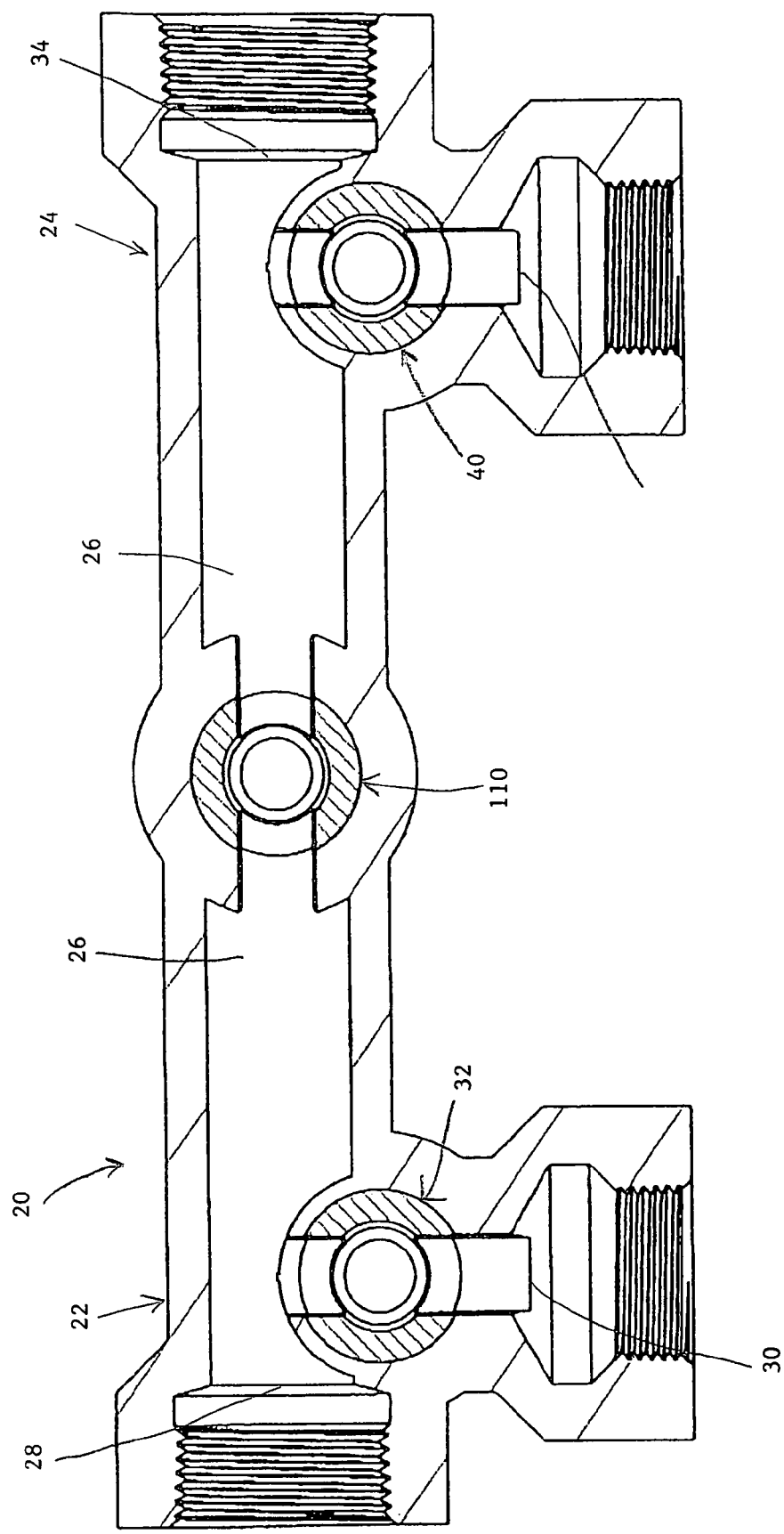
FIG. 10 is a cutaway view of an alternative embodiment of a meter bar.

Yet another embodiment is illustrated in FIG. 10. In this embodiment, a bypass valve 110 is also included in the bypass path 26 of the meter bar 20. The operation of the meter bar 20 shown in FIG. 10 is similar to that described above. However, the first step to bypass the meter (not shown) is to rotate the bypass valve 110 to the open position to define a flow path for the fluid between the first portion 22 and the second portion 24 via the bypass path 26, as illustrated in FIG. 10. As seen in this figure, the first valve 32 is still in the metering position as is the second valve 40. Once the bypass valve 110 is in the open position both of the first and second valves 32,40 can be moved to the respective bypass positions, similar to that illustrated in FIG. 8. After the meter (not shown) has been serviced or replaced, the first and second valves 32,40 can be positioned back to the respective metering positions. Subsequently, the bypass valve 110 can be rotated 90° to the closed position to prevent the fluid from flowing between the first portion 22 and the second portion 24 via the bypass path 26. While this embodiment is shown in the linear configuration, bypass path 26 of the meter bar 20 may also be U-shaped similar to the embodiments of FIGS. 4-9A. Other shapes may similarly be adapted to utilize the bypass valve 110 as understood by those skilled in the art. Additionally, while the valves 32,40,110 are illustrated as two-way valves, three-way valves or other valves may also be utilized similarly.

The meter bar embodiments and meter bar system described above can be adjusted as understood by those skilled in the art. For example, the type of valves and positioning of the valves may be manipulated as desired. Similarly, the sizes of the ports and apertures may be manipulated as desired and manipulated to provide higher flow rates when in intermediate positions. Additionally, the indicators may take any form as understood by those skilled in the art. Other aspects of the meter bar and meter bar system may be similarly manipulated.

The invention claimed is:

1. A meter bar for directing a fluid, the meter bar comprising:
   a first portion having a first service port, a first meter port and a first valve;
   a second portion having a second service port, a second meter port and a second valve; and
   a bypass path extending between the first portion and the second portion,
      the first valve movable between a metering position and a bypass position, in the metering position the first valve defines a flow path for the fluid between the first service port and the first meter port, and in the bypass position the first valve prevents the fluid from flowing between the first service port and the first meter port,
      the second valve movable independent from the first valve between a metering position and a bypass position, in the metering position the second valve defines a flow path for the fluid between the second meter port and the second service port, and in the bypass position the second valve defines a flow path for the fluid between the bypass path and the second service port.

2. A meter bar for directing a fluid, the meter bar comprising:
   a first portion having a first service port, a first meter port and a first valve; and
   a second portion having a second service port, a second meter port and a second
   a bypass path extending between the first portion and the second portion,
      the first valve movable between a metering position and a bypass position, in the metering position the first valve defines a flow path for the fluid between the first service port and the first meter port, and in the bypass position the first valve prevents the fluid from flowing between the first service port and the first meter port,
      the second valve movable between a metering position and a bypass position, in the metering position the second valve defines a flow path for the fluid between the second meter port and the second service port, and in the bypass position the second valve defines a flow path for the fluid between the bypass path and the second service port,
   further comprising a lock on at least one of the first and second valves to selectively prevent the valve from moving from the metering position into the bypass position and from the bypass position into the metering position.

3. The meter bar of claim 2 wherein the first valve is a rotatable two-way valve and the second valve is a rotatable three-way valve.

4. A meter bar for directing a fluid, the meter bar comprising:
a first portion having a first service port, a first meter port and a first valve;
a second portion having a second service port, a second meter port and a second valve; and
a bypass path extending between the first portion and the second portion,
the first valve movable between a metering position and a bypass position, in the metering position the first valve defines a flow path for the fluid between the first service port and the first meter port, and in the bypass position the first valve prevents the fluid from flowing between the first service port and the first meter port,
the second valve movable between a metering position and a bypass position, in the metering position the second valve defines a flow path for the fluid between the second meter port and the second service port, and in the bypass position the second valve defines a flow path for the fluid between the bypass path and the second service port,
wherein the first valve is a rotatable three-way valve and the second valve is a rotatable three-way valve.

5. The meter bar of claim 4 wherein the second valve includes at least one intermediate position between the metering and bypass positions such that the second valve simultaneously defines a flow path between the second service port and the second meter port and between the second service port and the bypass path.

6. The meter bar of claim 5 wherein each of the first and second valves includes a plurality of valve apertures.

7. The meter bar of claim 6 wherein at least one valve aperture in the first valve is sized to define a flow path between the first service port and both of the first meter port and the bypass path when the first valve is in an intermediate position.

8. The meter bar of claim 4 wherein the bypass path has a linear configuration extending from the first portion to the second portion.

9. The meter bar of claim 4 further comprising indicators on an exterior surface of the meter bar to represent the positions of the first and second valves.

10. The meter bar of claim 4 wherein the second valve in the bypass position prevents the fluid from flowing between the bypass path and the second meter port.

11. The meter bar of claim 4 wherein the first valve in the bypass position defines a flow path between the first service port and the bypass path.

12. A meter bar for directing a fluid, the meter bar comprising:
a first portion having a first service port, a first meter port and a first valve;
a second portion having a second service port, a second meter port and a second valve; and
a bypass path extending between the first portion and the second portion,
the first valve movable between a metering position and a bypass position, in the metering position the first valve defines a flow path for the fluid between the first service port and the first meter port, and in the bypass position the first valve prevents the fluid from flowing between the first service port and the first meter port,
the second valve movable between a metering position and a bypass position, in the metering position the second valve defines a flow path for the fluid between the second meter port and the second service port, and in the bypass position the second valve defines a flow path for the fluid between the bypass path and the second service port,
wherein the bypass path has a U-shaped configuration extending from the first portion to the second portion.

13. A fluid metering system for measuring fluid flow, the metering system comprising:
a fluid meter bar including
a first portion,
a second portion, and
a bypass path extending between the first portion and the second portion,
the first portion having a first service port, a first meter port and a first valve,
the second portion having a second service port, a second meter port, and a second valve,
the first valve movable between a metering position and a bypass position, in the metering position the first valve defines a flow path for the fluid between the first service port and the first meter port, and in the bypass position the first valve prevents the fluid from flowing between the first service port and the first meter port,
the second valve movable between a metering position and a bypass position, in the metering position the second valve defines a flow path for the fluid between the second meter port and the second service port, and in the bypass position the second valve defines a flow path for the fluid between the bypass path and the second service port; and
a fluid meter having a first fluid connection coupled to the first meter port, a second fluid connection coupled to the second meter port and a meter flow path extending between the first and second flow connectors,
further comprising a lock on at least one of the first and second valves to selectively prevent the valve from moving from the metering position into the bypass position and from the bypass position into the metering position.

14. The meter bar of claim 13 wherein the first valve is a rotatable two-way valve and the second valve is a rotatable three-way valve.

15. A fluid metering system for measuring fluid flow, the metering system comprising:
a fluid meter bar including
a first portion,
a second portion, and
a bypass path extending between the first portion and the second portion,
the first portion having a first service port, a first meter port and a first valve,
the second portion having a second service port, a second meter port, and a second valve,
the first valve movable between a metering position and a bypass position, in the metering position the first valve defines a flow path for the fluid between the first service port and the first meter port, and in the bypass position the first valve prevents the fluid from flowing between the first service port and the first meter port,
the second valve movable between a metering position and a bypass position, in the metering position the second valve defines a flow path for the fluid between the second meter port and the second service port, and in the bypass position the second valve defines a flow path for the fluid between the bypass path and the second service port; and a fluid meter having a first fluid connection coupled to the first meter port, a second fluid connection coupled to the second meter port and a meter flow path extending between the first and second flow connectors, wherein the first valve is a rotatable three-way valve and the second valve is a rotatable three-way valve.

16. The fluid metering system of claim 15 wherein the second valve includes at least one intermediate position between the metering and bypass positions such that the second valve simultaneously defines a flow path between the second service port and the second meter port and between the second service port and the bypass path.

17. The meter bar of claim 16 wherein each of the first and second valves includes a plurality of valve apertures.

18. The meter bar of claim 17 wherein at least one valve aperture in the first valve is sized to define a flow path between the first service port and both of the first meter port and the bypass path when the first valve is in an intermediate position.

19. The meter bar of claim 15 wherein the bypass path has a linear configuration extending from the first portion to the second portion.

20. The meter bar of claim 15 further comprising indicators on an exterior surface of the meter bar to represent the positions of the first and second valves.

21. The meter bar of claim 15 wherein the second valve in the bypass position prevents the fluid from flowing between the bypass path and the second meter port.

22. The meter bar of claim 15 wherein the first valve in the bypass position defines a flow path between the first service port and the bypass path.

23. A fluid metering system for measuring fluid flow, the metering system comprising:
  a fluid meter bar including
    a first portion,
    a second portion, and
    a bypass path extending between the first portion and the second portion,
    the first portion having a first service port, a first meter port and a first valve,
    the second portion having a second service port, a second meter port, and a second valve,
    the first valve movable between a metering position and a bypass position, in the metering position the first valve defines a flow path for the fluid between the first service port and the first meter port, and in the bypass position the first valve prevents the fluid from flowing between the first service port and the first meter port,
    the second valve movable between a metering position and a bypass position, in the metering position the second valve defines a flow path for the fluid between the second meter port and the second service port, and in the bypass position the second valve defines a flow path for the fluid between the bypass path and the second service port; and
  a fluid meter having a first fluid connection coupled to the first meter port, a second fluid connection coupled to the second meter port and a meter flow path extending between the first and second flow connectors,
  wherein the bypass path has a U-shaped configuration extending from the first portion to the second portion.

24. A meter bar for directing a fluid, the meter bar comprising:

an inlet portion having a fluid inlet port, a meter inlet port and an inlet valve;

an outlet portion having a fluid outlet port, a meter outlet port and an outlet valve; and a bypass path extending between the inlet portion and the outlet portion,
  the inlet valve movable between a metering position and a bypass position, in the metering position the inlet valve defines a flow path for the fluid between the fluid inlet port and the meter inlet port, and in the bypass position the inlet valve defines a flow path for the fluid between the fluid inlet port and the bypass path,
  the outlet valve movable between a metering position and a bypass position, in the metering position the outlet valve defines a flow path for the fluid between the meter outlet port and the fluid outlet port, and in the bypass position the outlet valve defines a flow path for the fluid between the bypass path and the fluid outlet port, further comprising a lock on at least one of the first and second valves to selectively prevent the valve from moving from the metering position into the bypass position and from the bypass position into the metering position.

25. A meter bar for directing a fluid, the meter bar comprising:

an inlet portion having a fluid inlet port, a meter inlet port and an inlet valve;

an outlet portion having a fluid outlet port, a meter outlet port and an outlet valve; and a bypass path extending between the inlet portion and the outlet portion,
  the inlet valve movable between a metering position and a bypass position, in the metering position the inlet valve defines a flow path for the fluid between the fluid inlet port and the meter inlet port, and in the bypass position the inlet valve defines a flow path for the fluid between the fluid inlet port and the bypass path,
  the outlet valve movable between a metering position and a bypass position, in the metering position the outlet valve defines a flow path for the fluid between the meter outlet port and the fluid outlet port, and in the bypass position the outlet valve defines a flow path for the fluid between the bypass path and the fluid outlet port, wherein the first valve is a three-way valve.

26. The meter bar of claim 25 wherein the first valve includes at least one intermediate position between the metering and bypass positions such that the first valve simultaneously defines a flow path between the first service port and the first meter port and between the first service port and the bypass path.

27. The meter bar of claim 26 wherein the second valve includes at least one intermediate position between the metering and bypass positions such that the second valve simultaneously defines a flow path between the second service port and the second meter port and between the second service port and the bypass path.

28. The meter bar of claim 25 wherein at least one valve aperture in the first valve is sized to define a flow path between the first service port and both of the first meter port and the bypass path when the first valve is in an intermediate position.

29. The meter bar of claim 25 wherein the second valve is a three-way valve.

30. The meter bar of claim 25 wherein the bypass path has a linear configuration extending from the first portion to the second portion.

31. The meter bar of claim 25 wherein the bypass path has a U-shaped configuration extending from the first portion to the second portion.

32. The meter bar of claim 25 further comprising indicators on an exterior surface of the meter bar to represent the positions of the first and second valves.

33. The meter bar of claim 25 wherein the second valve in the bypass position prevents the fluid from flowing between the bypass path and the second meter port.

34. A meter bar for directing a fluid, the meter bar comprising:
- a first portion having a first service port, a first meter port and a first valve;
- a second portion having a second service port, a second meter port and a second valve; and
- a bypass path having a bypass valve, the bypass path extending between the first portion and the second portion,
    - the first valve movable between a metering position and a bypass position, in the metering position the first valve defines a flow path for the fluid between the first service port and the first meter port, and in the bypass position the first valve prevents the fluid from flowing between the first service port and the first meter port,
    - the second valve movable between a metering position and a bypass position, in the metering position the second valve defines a flow path for the fluid between the second meter port and the second service port, and in the bypass position the second valve prevents the fluid from flowing between the second meter port and the second service port,
    - the bypass valve movable between an open position and a closed position, in the open position the bypass valve defines a flow path for the fluid between the first portion and the second portion via the bypass path, and in the closed position the bypass valve prevents the fluid from flowing between the first portion and the second portion via the bypass path.

35. The meter bar of claim 34 wherein the second valve includes at least one intermediate position between the metering and bypass positions such that the second valve simultaneously defines a flow path between the second service port and the second meter port and between the second service port and the bypass path.

36. The meter bar of aim 35 wherein each of the first and second valves includes a plurality of valve apertures.

37. The meter bar of claim 36 where in at least one valve aperture in the first valve is Sized to define a flow path between the first service port and both of the first meter port and the bypass path when the first valve is in an intermediate position.

38. The meter bar of aim 34 further comprising a lock on at least one of the first and second valves to selectively prevent the valve from moving from the metering position into the bypass position and from the bypass position into the metering position.

39. The meter bar of claim 34 wherein the first valve is a rotatable two-way valve, the second, valve is a rotatable two-way valve and the bypass valve is a rotatable two-way valve.

40. The meter bar of claim 34 wherein the bypass path has a linear configuration extending from the first portion to the second portion.

41. The mar bar of claim 34 wherein the bypass path has a U-shaped configuration extending from the first portion to the second portion.

42. The meter bar of claim 34 further comprising indicators on an exterior surface of the meter bar to represent the positions of the first and second valves.

* * * * *

UNITED STATES PATENT AND TRADEMARK OFFICE
CERTIFICATE OF CORRECTION

PATENT NO. : 7,347,219 B2
APPLICATION NO. : 11/254579
DATED : March 25, 2008
INVENTOR(S) : Jon Gohde et al.

It is certified that error appears in the above-identified patent and that said Letters Patent is hereby corrected as shown below:

Column 8, line 41, delete "and" (second occurrence); and line 43, after "a second" insert --valve; and--.

Column 14, line 11, delete "aim" and substitute therefor --claim--;

line 13, delete "where in" and substitute therefor --wherein--;

line 14, delete "Sized" and substitute therefor --sized--;

line 18, delete "aim" and substitute therefor --claim--;

line 24, after 'second" delete ","; and line 31, delete "mar" and substitute therefor --meter--.

Signed and Sealed this

Eighth Day of July, 2008

JON W. DUDAS
*Director of the United States Patent and Trademark Office*